US012789224B2

(12) United States Patent
Box

(10) Patent No.: US 12,789,224 B2
(45) Date of Patent: Nov. 10, 2026

(54) SUBMERSIBLE FRAME FOR MAINTAINING A BUOYANT OBJECT IN A FLAT STATE DURING A COATING PROCESS

(71) Applicant: SIGMA CORPORATION, Cream Ridge, NJ (US)

(72) Inventor: Seth R. Box, Jefferson, GA (US)

(73) Assignee: SIGMA CORPORATION, Cream Ridge, NJ (US)

( * ) Notice: Subject to any disclaimer, the term of this patent is extended or adjusted under 35 U.S.C. 154(b) by 0 days.

(21) Appl. No.: 18/790,442

(22) Filed: Jul. 31, 2024

(65) Prior Publication Data

US 2026/0034561 A1 Feb. 5, 2026

(51) Int. Cl.
*B05C 13/02* (2006.01)
*B05C 3/02* (2006.01)
*B05C 3/09* (2006.01)
*B05C 3/10* (2006.01)
*B05D 1/18* (2006.01)

(52) U.S. Cl.
CPC ................ *B05C 13/02* (2013.01); *B05C 3/02* (2013.01); *B05C 3/09* (2013.01); *B05C 3/10* (2013.01); *B05D 1/18* (2013.01)

(58) Field of Classification Search
CPC .......... B05C 13/00; B05C 13/02; B05C 3/00; B05C 3/02; B05C 3/09; B21C 37/042; B65G 49/04; B65G 49/0409; B65G 49/0413; B65G 49/0431; B65G 49/0463; B65G 49/0454; D07B 2205/3071
See application file for complete search history.

(56) References Cited

U.S. PATENT DOCUMENTS 2,818,980 A * 1/1958 Losching ................ A01J 7/025 211/41.4
3,063,281 A * 11/1962 Bell ......................... D06B 5/00 68/199
3,945,901 A * 3/1976 Nessar ................... C25D 17/28 204/508
5,799,613 A * 9/1998 Greenhaw ................ C25D 7/00 119/452

(Continued)

FOREIGN PATENT DOCUMENTS

CN 115502030 A 12/2022
CN 116580961 A 8/2023

(Continued)

*Primary Examiner* — Tyrone V Hall, Jr.
(74) *Attorney, Agent, or Firm* — Caesar Rivise, PC

(57) ABSTRACT

An apparatus and method for a frame that contains a buoyant object therein and wherein the frame and buoyant object can be submersed in tank of a liquid coating material to fully and uniformly coat the buoyant object. The frame is formed of a top wire mesh and bottom wire mesh coupled together with sidewalls and having an open front and back. The frame maintains the buoyant object in a flat state without distortion during the entire submersion process to allow the entire surface area of the buoyant object to be coated. The top and bottom wire meshes alternately come into contact with opposite surfaces of the buoyant object during descent and ascent of the frame during the coating process. A lifting lug is secured to a center portion of the top wire mesh to maintain the frame in a level orientation through the coating process.

7 Claims, 6 Drawing Sheets

(56) References Cited

U.S. PATENT DOCUMENTS

2023/0083367 A1 3/2023 Kamiya et al.

FOREIGN PATENT DOCUMENTS

| | | | |
|---|---|---|---|
| CN | 116764880 | A | 9/2023 |
| CN | 219731039 | U | 9/2023 |
| CN | 116851206 | A | 10/2023 |
| CN | 116998438 | A | 11/2023 |
| CN | 117066054 | A | 11/2023 |
| CN | 117259114 | A | 12/2023 |
| CN | 117445274 | A | 1/2024 |
| CN | 117505166 | A | 2/2024 |
| CN | 115281133 | B | 3/2024 |
| CN | 117983445 | A | 5/2024 |
| KR | 102554025 | B1 | 7/2023 |

* cited by examiner

SUBMERSIBLE FRAME FOR MAINTAINING A BUOYANT OBJECT IN A FLAT STATE DURING A COATING PROCESS

BACKGROUND OF THE INVENTION

The present invention relates generally to liquid material application devices and, more particularly, to an apparatus and method for uniformly applying a coating to a buoyant object submerged in a coating material.

In particular instances, it is necessary to uniformly treat a buoyant object with a protective coating by submersing the buoyant object in a tank of the protective coating. However, as can be appreciated, attempting to submerge a buoyant object (e.g., an object comprised of Styrofoam® into a liquid will result in the object distorting, due to its buoyancy, resulting in an incomplete and non-uniform application of the coating material on the buoyant object.

Thus, there remains a need for a device into which a buoyant object can be placed and then submerged into a tank of coating material without the buoyant object distorting during the submersion process. The subject invention addresses that need.

All references cited herein are incorporated herein by reference in their entireties.

BRIEF SUMMARY OF THE INVENTION

A frame for containing a buoyant object therein to be submerged within a tank of a coating material is disclosed. The frame comprises: a pair of opposing wire meshes coupled together by a pair of opposing sidewalls to form an enclosure with a pair of opposing open sides for receiving the buoyant object therein, wherein the enclosure maintains the buoyant object in an undistorted flat state as the frame is lowered into the coating material and then submerged therein; and wherein the pair of opposing wire meshes and the pair of opposing sidewalls comprises a material having a density greater than a density of the coating material.

A method for evenly coating a buoyant object by submerging the buoyant object without distortion in a coating material in a tank is disclosed. The method comprises: forming a submersible frame having a pair of opposing wire meshes coupled together by a pair of opposing sidewalls to form an enclosure with a pair of opposing open sides, and whereby the enclosure maintains the buoyant object in an undistorted flat state, and wherein the pair of opposing wire meshes and the pair of opposing sidewalls comprises a material having a density greater than a density of the coating material; inserting the object into the submersible frame through one of the open sides; lowering the submersible frame with the buoyant object therein into the coating material while maintaining the frame in a level position; maintaining the submersible frame with the buoyant object therein in the coating material for approximately a 5-10 second dwell time; following the dwell time, raising the submersible frame with the buoyant object therein while maintaining the frame in a level position; positioning the submersible frame with the buoyant object therein on a conveyor to enable air to circulate around an entirety of the submersible frame and coated buoyant object; and removing the coated buoyant object from the submersible frame through one of the openings after the coated buoyant object and the submersible frame are dry.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
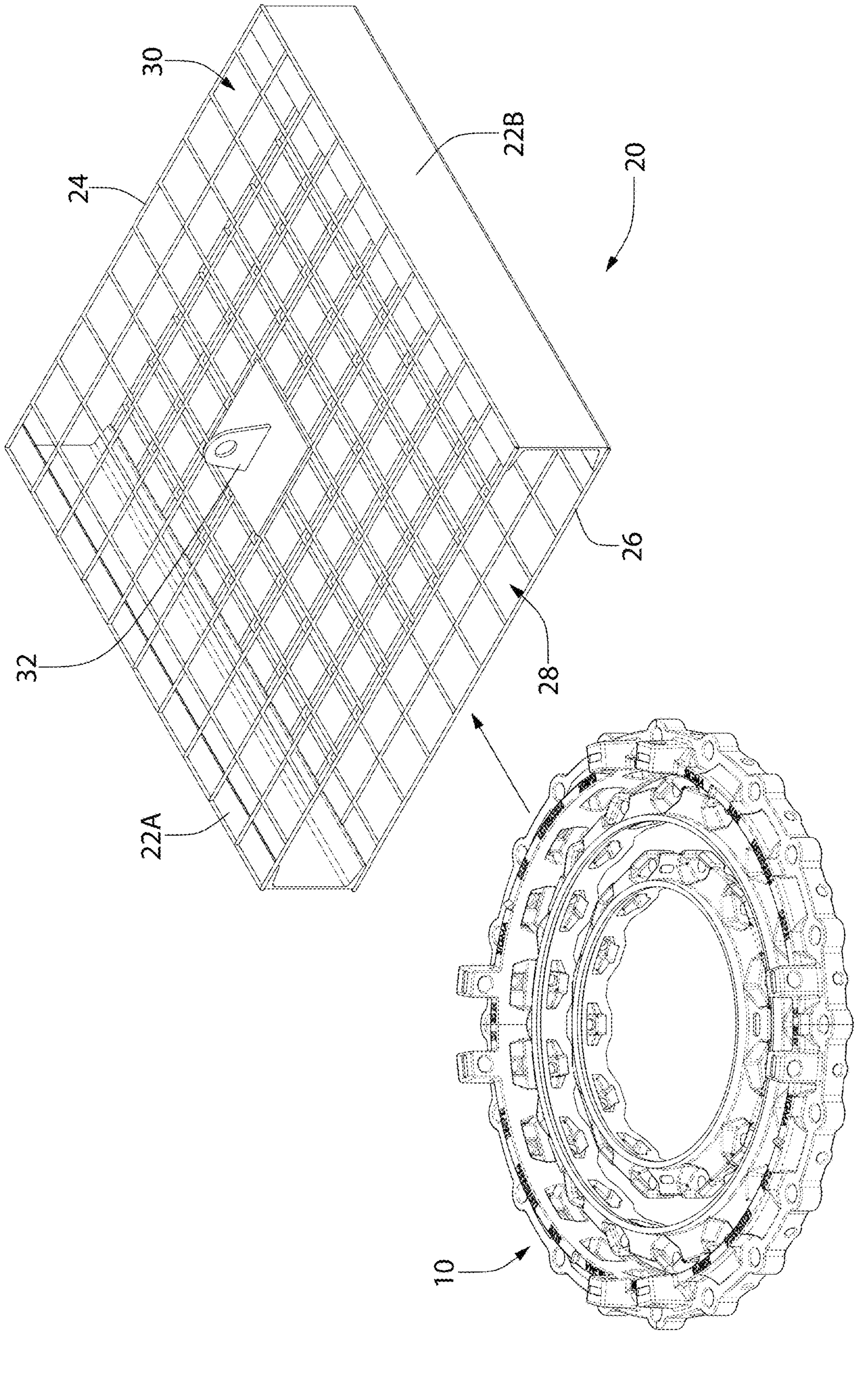
FIG. 1 is an isometric view of the submersible frame of the present invention with the nested buoyant rings about to be inserted into the submersible frame.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

The invention relates to a device for coating a buoyant object 10. By way of example only, the following discussion and supporting figures depict two nested buoyant rings for the term "buoyant object". Thus, it should be understood that other buoyant items could used, or more than two nested rings could used; as such, the term "buoyant object 10" covers any and all of these different buoyant items. After the uniform coating is applied to the buoyant rings, the buoyant rings are then subjected to other processes to ultimately form a pipe restraint product for joining pipes. Thus, the "rings" depicted have a unique contour for purposes of forming the pipe restraint. But again, these rings are by way of example only.

FIG. 1 depicts a submersible frame 20 (also referred to as a "dunk box") into which a buoyant object 10 (e.g., rings of buoyant material, e.g., Styrofoam®) can be placed and then submerged into a tank 12 of coating material 14 (e.g., a ceramic coating material, such as a zirconium/silicon dioxide coating, etc.), without the buoyant object 10 distorting when submerged due to its buoyancy. In particular, the submersible frame 20 comprises a pair of opposing wire meshes, namely, a top wire mesh 24 and a bottom wire mesh 26 that are coupled together by a pair of opposing sidewalls 22A/22B to form an enclosure. A front 28 and a back 30 of the submersible frame 20 are open. The top wire mesh 24 and the bottom wire mesh each comprise a wire mesh 0.25 inch wire with 4 inch openings by way of example only. The wire meshes 24 and 16 are zinc-coated steel wire mesh.

The wire mesh 24 and bottom wire mesh 26 may be welded to the sidewalls 22A/22B or coupled to the sidewalls 22A/22B with fasteners (e.g., screws, bolts, etc.).

The sidewalls 22A/22B comprise a dense material (e.g., steel) that will sink when submerged into the tank 12 comprising a coating material 14. Similarly, as mentioned above, the top wire mesh 24 and the bottom wire mesh 26 also comprise dense material (e.g., steel) that assists in sinking the frame 20.

The open front 28 and back 30, in conjunction with the top wire mesh 24 and bottom wire mesh 26, allow coating material 14 to enter the frame 20 and thereby coat the entire outer surface of the buoyant object 10.

An important feature of the present invention 20 is that the wire mesh 24 and the bottom wire mesh 26 also act to maintain the buoyant object 10 in a flat state during the entire submersion process. The buoyant object 10 is captured and supported in between the top and bottom wire mesh 24/26. In addition, the submersible frame 20 has been designed to keep the buoyant object flat while also creating a minimal number of contact points to prevent an excess amount of area that does not get coated in the protective ceramic coating.

To achieve this non-distortion of the buoyant object 10 using the frame 20, the spacing between the top/bottom wire meshes 24/26 is approximately 1.4 times the largest height dimension of the buoyant object 10. Thus, by way of example, the largest height dimension of the buoyant rings (e.g., 30 inch diameter buoyant ring) shown as the buoyant object 10 in this application is approximately 5.0 inches. Thus, the spacing between the inside surfaces of the top and bottom wire meshes 24/26 is approximately 7.0 inches. Similarly, for larger buoyant rings (e.g., 36 inch-48 inch diameter buoyant rings) having a height of approximately 7.0 inches, the spacing between top and bottom wire meshes 24/26 is approximately 9.8 inches. Thus, the height of the sidewalls 22A./22B are determined based on this relationship.

The shape of the frame 20 is square and may be formed in various sizes, depending on the size of the buoyant objects 10 being coated. Thus, by way of example only, the frame 20 size may comprise 7.0"×40" or 40" and has a weight of approximately 95 pounds for coating the 5.0 inch buoyant rings. It should be further understood that the submersible frame 20 is not limited to being a square or rectangular shape but could be a wide variety of shapes as long as the spacing between the top/bottom wire meshes 24/26 conforms to the previous discussion.

The following discussion is directed to the coating process.

Figure 2:
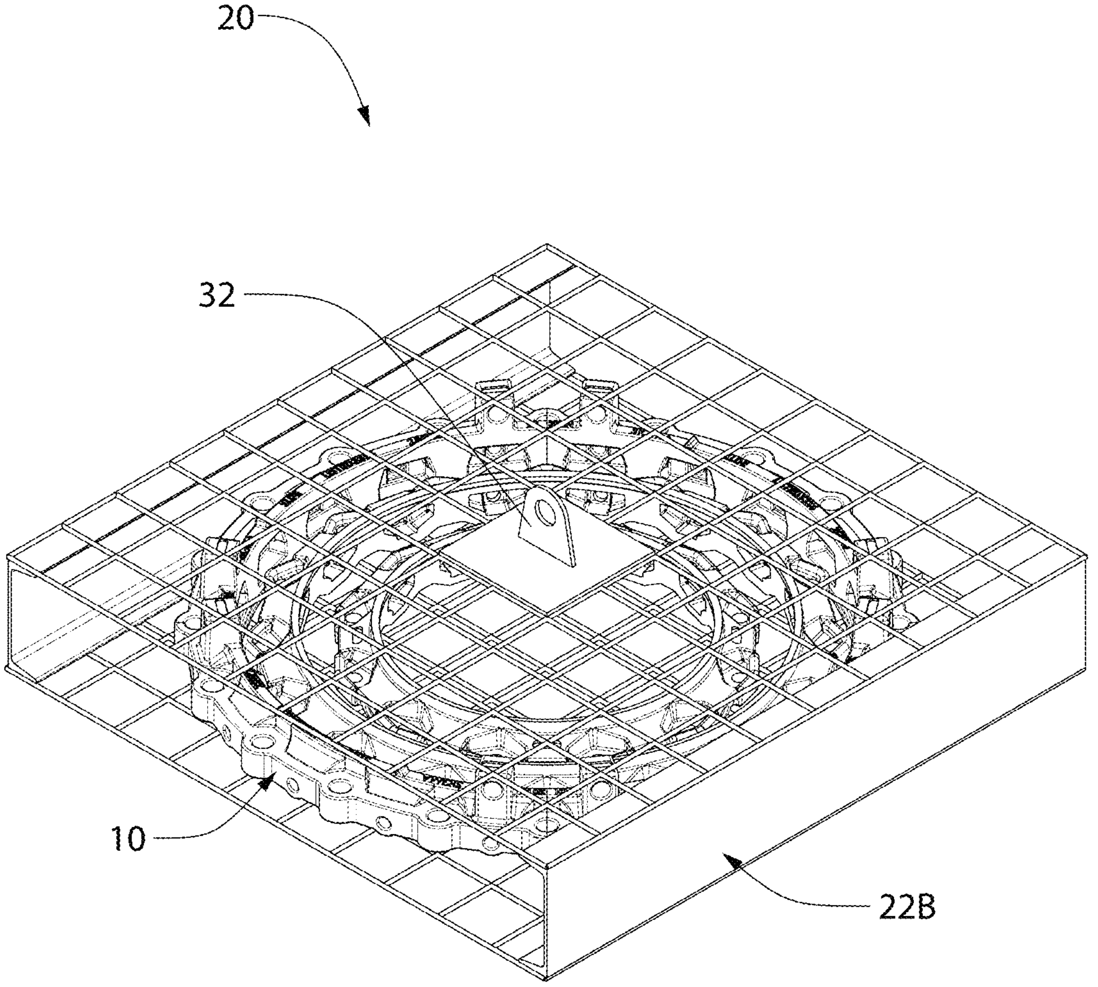
FIG. 2 is an isometric view of the submersible frame of the present invention showing the nested buoyant rings positioned therein for application of a ceramic coating thereover.
Figure 3:
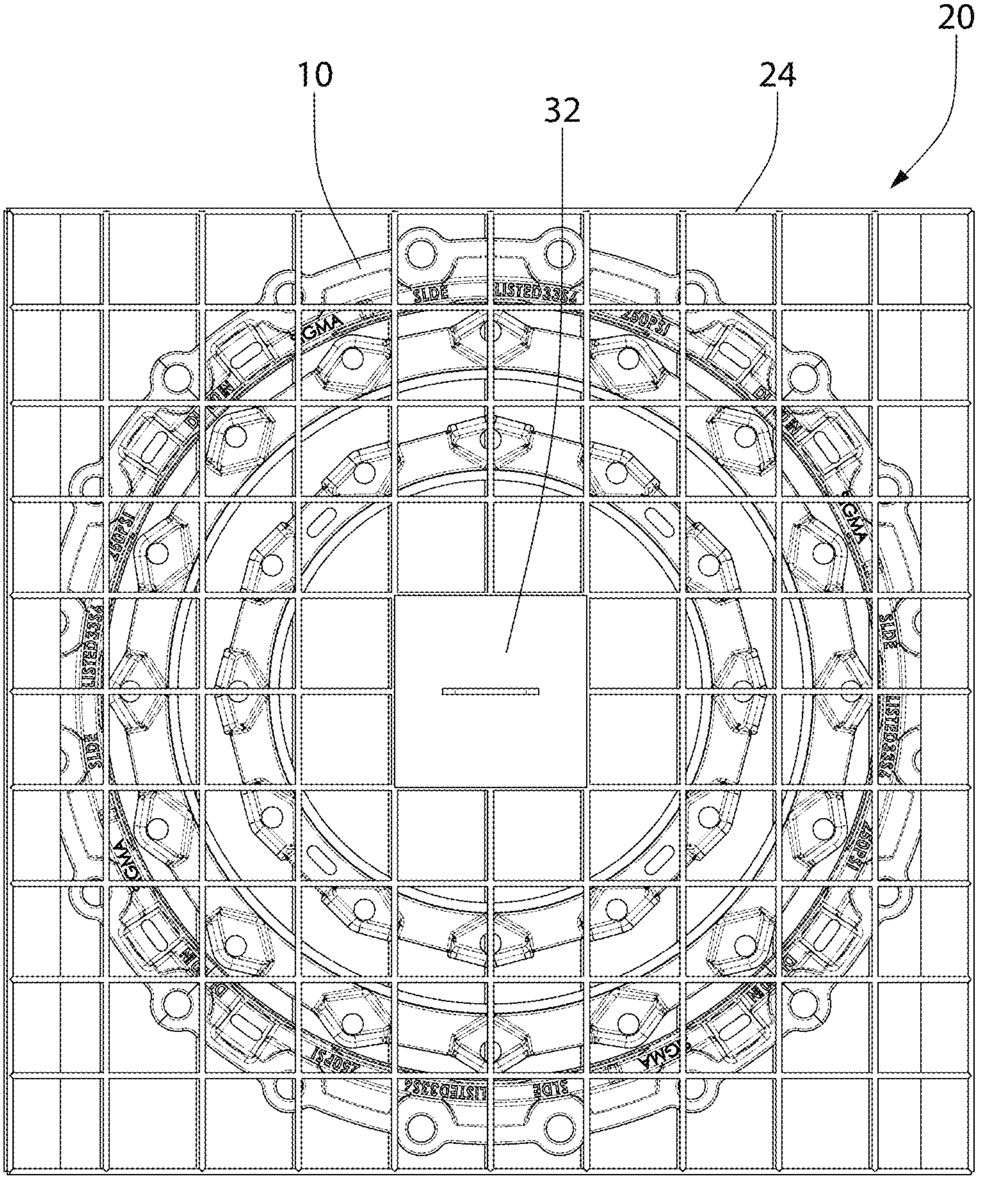
FIG. 3 is a top view of the submersible frame of FIG. 2.
Figure 4:
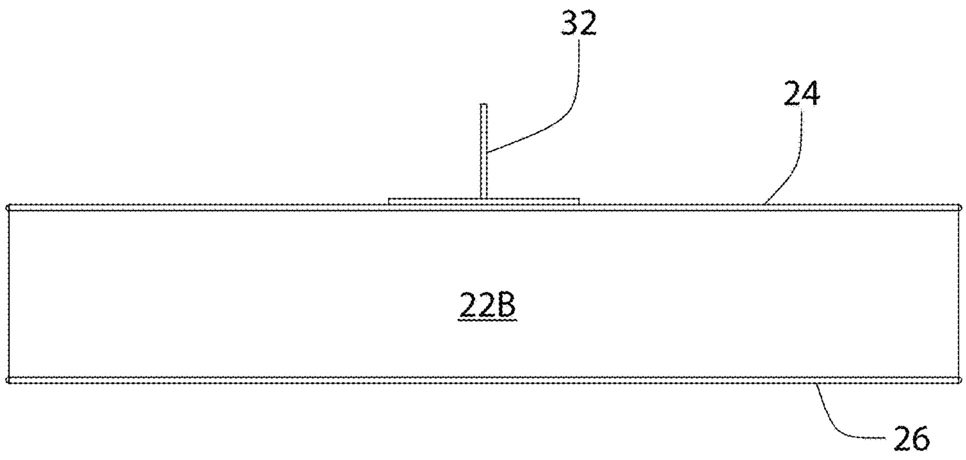
FIG. 4 is a side view of the submersible frame of FIG. 2.
Figure 5:
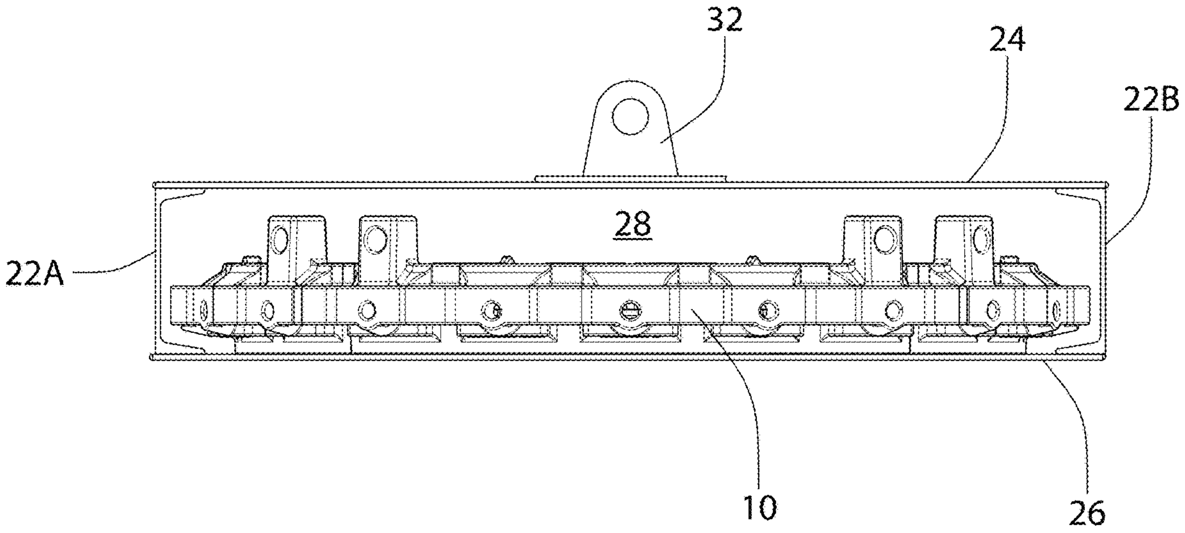
FIG. 5 is a front view of the submersible frame of FIG. 2.
Figure 6:
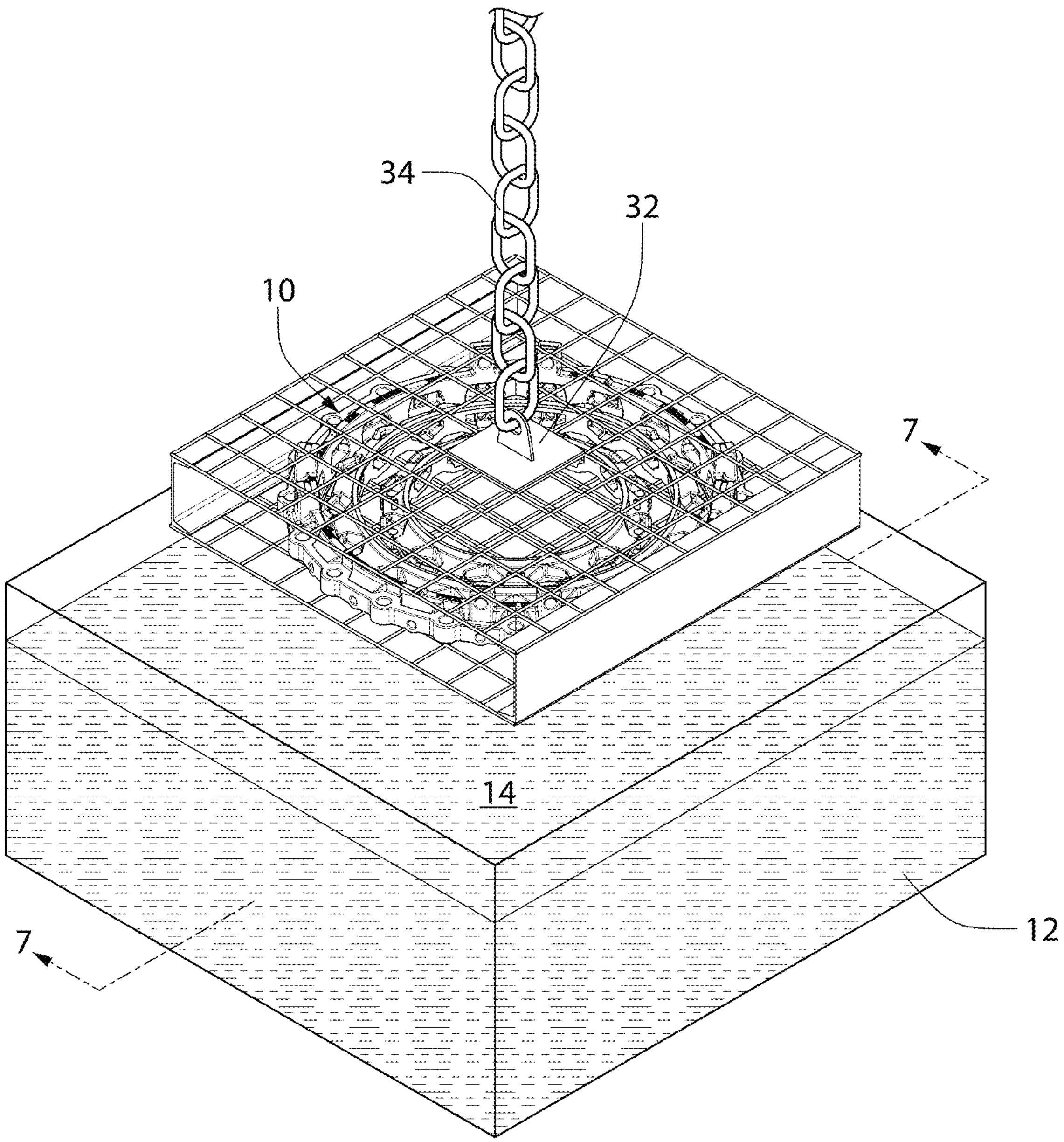
FIG. 6 is an isometric view of the submersible frame containing the nest buoyant rings about to be submersed into the tank of ceramic coating.
Figure 7:
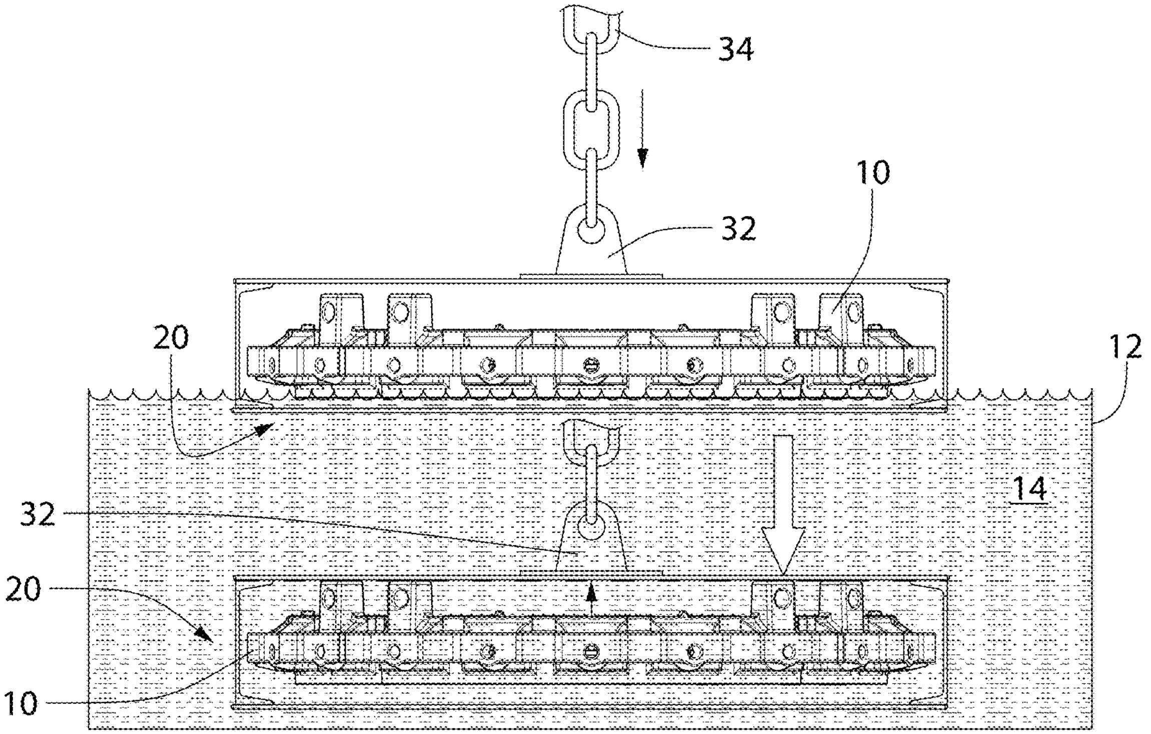
FIG. 7 is a cross-sectional view of the tank with the submersible frame and buoyant rings taken along line 7-7 of FIG. 6 showing the movement of the buoyant rings as the submersible frame initially encounters the ceramic coating and then is completely submerged with the nested buoyant rings remaining undistorted during the entire submersion process.
Figure 8:
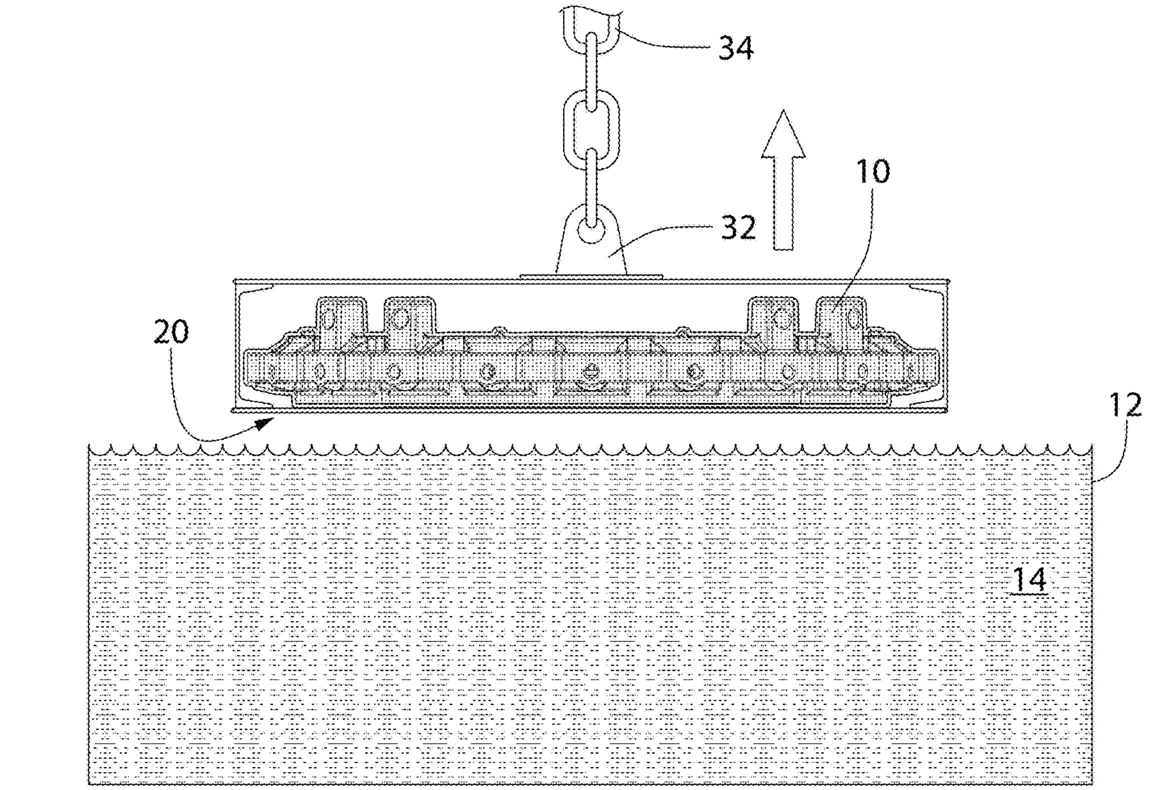
FIG. 8 is a cross-sectional view similar to FIG. 7 but showing the submersible frame and nested buoyant rings now uniformly coated with the ceramic coating and raised out of the tank.

In particular, the buoyant object 10 (e.g., nested buoyant rings) is inserted into the submersible frame 20 though one of the openings 28 or 30 (in FIG. 1, front opening 28 is used) and FIGS. 2-3 and 5 depict the buoyant object 10 resting inside the submersible frame 20; FIG. 4 shows a side view. The submersible frame 20 with the buoyant object 10 is then positioned over a tank 12 containing the ceramic coating using a chain hoist 34 coupled to a lifting lug 32 (FIG. 6) positioned over the center of the submersible frame 20 on the top wire mesh 24. As the frame 20 is submerged into the ceramic coating 14 in the tank 12 (FIG. 7), the object 10 will tend to "float" in the coating material 14; as such, as shown in FIG. 7, the object 10 floats up against the top wire mesh 24, thereby allowing the bottom face of the object 10 to be fully and uniformly coated. Once the frame 20 becomes fully submerged (FIG. 7, lower portion), the frame 20 is able to sink the object 10 while keeping it flat against the inside surface of the top wire mesh 24. Nested objects allow for simultaneous treatment to the coating material 14.

As mentioned previously, the lifting lug 32 is provided at the center of the top wire mesh 24 to ensure that the frame 20 is suspended in a level position, keeping the buoyant object 10 flat as it is lowered into (and later raised from) the ceramic coating. The chain hoist 34 is coupled to the lifting lug 32 for lowering and raising the frame 20 into and of out of the tank 12 of the coating material 14.

The internal portions of the submersible frame 20 may be treated with Teflon® non-stick material to avoid the coated buoyant object 10 from adhering to any internal portion of the frame during the process.

The coating material 14 applied to the buoyant object 10 can be for any purpose. By way of example only, the ceramic coating material 14 discussed above, once applied to the buoyant object 10 prevents the buoyant material from absorbing moisture and possibly changing shape due to the moisture absorption.

The process of coating the buoyant object 10 is as follows:

1) The buoyant object 10 is manually placed into the frame 20 through either the open front 28 or the open back 30.
2) The frame 20 with the buoyant object 10 is lowered into the tank 12 via the lifting lug 32/chain hoist 34;
3) The frame 20 is submerged into the coating material 14 where it dwells for approximately 5-10 seconds. During this time the ceramic coating 14 is agitated to ensure that there is no trapped air and all surfaces of the buoyant object 10 is coated sufficiently.
4) At the end of 5-10 seconds, the frame 20 is lifted upward through the ceramic coating material 14 using the lifting lug 32/chain hoist 34, keeping the frame 20 level to ensure that the coated object 10 remains level during the ascent, as the buoyant force pushes the buoyant object 10 to the top wire mesh 24 and then the bottom inside surface of the coating frame 20 contacts the bottom of the buoyant object 10.
5) The coating frame 20 is then placed on a conveyor (not shown) where air is able to circulate around the entirety of the frame 20 and coated object 10 to ensure that the ceramic coating dries evenly.
6) Once the buoyant object 10 and the coating frame 20 have dried, the buoyant object 10 is removed from the coating frame 20 via one of the two open ends 28/30.

It should be understood that the frame 20 has been designed and optimized:

that there is sufficient weight in the structure to submerge the buoyant object 10;

that there is sufficient open area in the wire meshes 24/26 to allow for the coating material 14 to effectively flow around the buoyant object 10 and evenly coat all surfaces, while ensuring that the wire mesh 26 has enough structural integrity to support the buoyant object 10 after it has been coated and is drying; and that the amount of open area maintains the buoyant object's 10 flatness while also giving enough ventilation for even drying.

While the invention has been described in detail and with reference to specific examples thereof, it will be apparent to one skilled in the art that various changes and modifications can be made therein without departing from the spirit and scope thereof.

What is claimed is:

1. A frame for containing a buoyant object therein to be submerged within a tank of a coating material, said frame comprising:

a pair of opposing wire meshes coupled together by a pair of opposing sidewalls to form an enclosure with a pair of opposing open sides for receiving the buoyant object therein, said enclosure maintaining the buoyant object in an undistorted flat state as said frame is lowered into the coating material and then submerged therein, and wherein each of said sidewalls comprises a height that is 1.4 times a largest height of the buoyant object; and said pair of opposing wire meshes and said pair of opposing sidewalls comprising a material having a density greater than a density of the coating material.

2. The frame of claim 1 wherein said each of said wire meshes comprises an open area that permits the coating material to flow around the buoyant object positioned within the enclosure to evenly coat all surfaces of the buoyant object while providing structural integrity to support the buoyant object during the submersion in the coating material and during a removal of the frame from the coating material and during a drying period of the coating material.

3. The frame of claim 1 wherein said sidewalls comprise steel.

4. The frame of claim 1 wherein said wire meshes comprise zinc-coated steel wire mesh.

5. The frame of claim 1 wherein said frame comprises a square configuration in length and width.

6. The frame of claim 1 comprising a lifting lug that is coupled to an outer surface of one of said pair of wire meshes at a center location to maintain said frame in a level position during use.

7. The frame of claim 1 wherein said pair of wire meshes comprise inner surfaces that are treated with a non-stick material to prevent the buoyant object coated with the coating material from adhering to said inner surfaces.

* * * * *